UNITED STATES PATENT OFFICE.

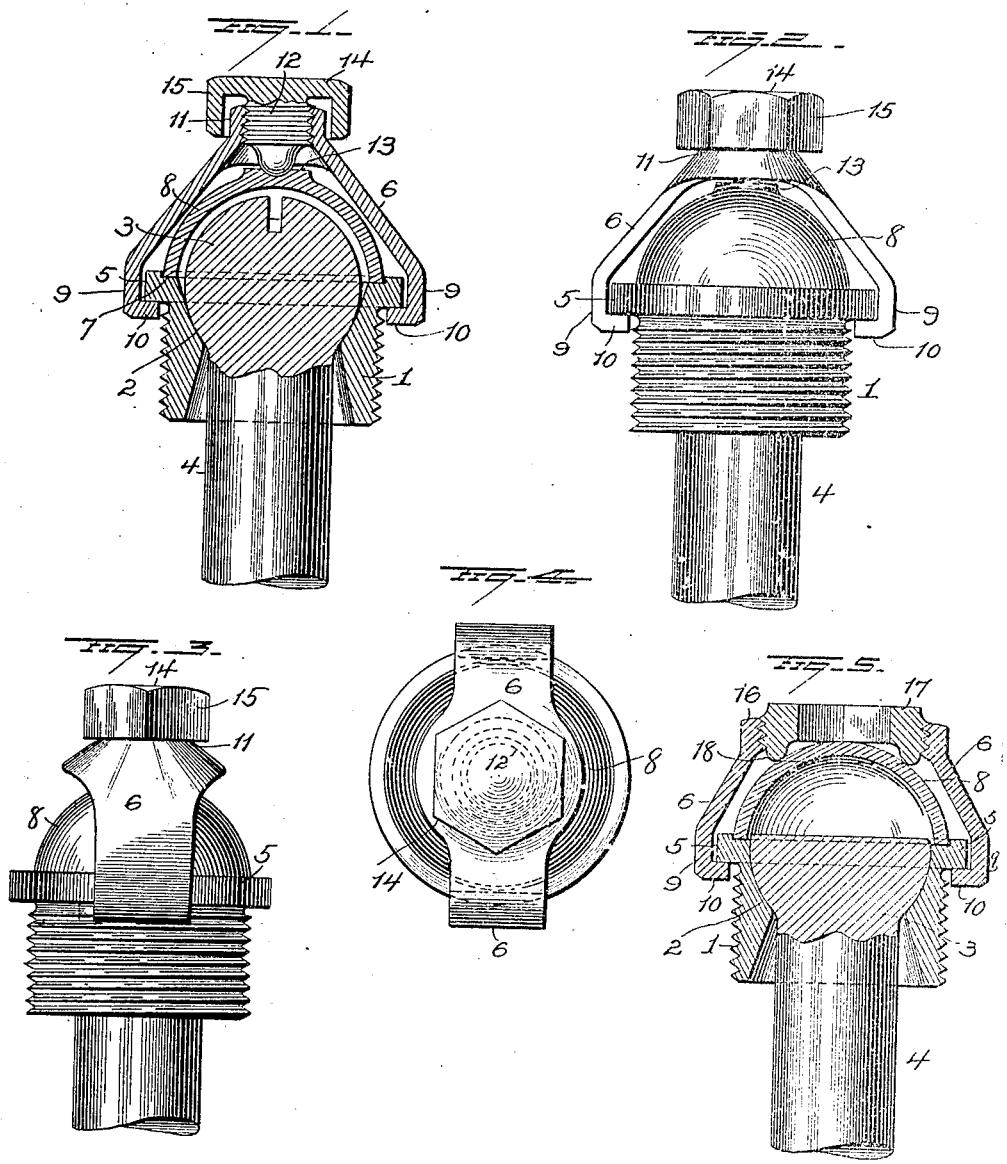

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,291,785.  Specification of Letters Patent.  Patented Jan. 21, 1919.

Application filed April 26, 1918. Serial No. 230,904.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures for boilers, and more particularly to means for closing the outer end of the bearing sleeve,—the object of the invention being to provide a simple and efficient structure which will facilitate the quick removal of the cap or closure of the bearing sleeve to permit ready access to the bolt for testing the same, and which will normally retain the cap or closure tightly seated.

With this and other objects in view, the invention consists in certain novel features of construction and combinations of parts as hereinafter set forth and pointed out in the claims.

In the accompanying drawings; Figure 1 is a sectional view of a staybolt structure embodying my invention; Figs. 2 and 3 are views in elevation taken at right angles to each other; Fig. 4 is a plan view, and Fig. 5 is a sectional view illustrating a modification.

1 represents a bearing sleeve to enter a suitable hole in a boiler sheet and provided with an interior curved face 2 which serves as a bearing for the curved or spherical head 3 of a staybolt 4. The bearing sleeve is provided at its outer end with a flange 5 to receive a cap securing member 6, and with a seat 7 for the edge of a hemi-spherical cap 8,—the latter being made of such configuration and proportions as to provide for suitable clearance of the head of the bolt.

The securing member 6 is made in the form of a yoke having a general conical shape and provided at the inner ends of its arms with jaws 9, the lips 10 of which engage behind the flange 5 at the outer end of the bearing sleeve. The arms of the securing member or yoke 6 converge to a head portion or collar 11 with which said arms may be integral, and said head or collar is made with internal threads for the accommodation of a screw 12. The inner end of this screw may be slightly rounded and engages a seat 13 on the cap or closure 8, while the exposed head 14 of said screw may be made with a flange 15 which freely encircles a portion of the head or collar 11. The head 14 of the screw and its flange 15 may be made angular in form to receive a wrench, the flange 15 affording extended bearing faces for the wrench.

It is apparent that when the parts are assembled and the clamping screw is operated, the cap or closure will be forced tightly against its seat at the end of the bearing sleeve. By turning the clamping screw in the reverse direction, the cap will be released and can be quickly removed with the securing member or yoke to expose the head of the bolt and permit the testing of the latter. The cap may be as quickly replaced and securely clamped in position.

In the form of the invention shown in Fig. 5, the threaded head or collar 16 of the yoke is enlarged and the clamping screw is made in the form of a threaded ring 17 having an angular flange 18 at its inner end to engage the cap 8, and the interior of said ring may be made angular to receive a wrench.

Other slight changes might be made in the details of construction of my invention without departing from the spirit thereof or limiting its scope, and hence I do not wish to restrict myself to the precise details set forth except as defined by the appended claims.

Having fully described my invention what I claim as new and desire to secure by Letters-Patent, is:—

1. In a staybolt structure, the combination with a bearing sleeve having a flanged outer end portion, and a removable cap or closure seated on said sleeve, of securing means comprising a yoke to engage the flanged outer end of the sleeve and a screw threaded through said yoke and adapted to engage the cap or closure.

2. In a staybolt structure, the combination with a bearing sleeve having a flanged outer end portion, and a removable cap or closure seated on said sleeve, of securing means comprising a yoke having arms provided with jaws to engage behind the flanged outer end of the bearing sleeve, said yoke having an internally threaded head portion, and a manually operable screw passing through the head portion of the yoke and engaging the removable cap or closure.

3. In a staybolt structure, the combination with a bearing sleeve having a flanged outer end portion, and a removable cap or closure seated on said sleeve, of securing means comprising a yoke having jaws to engage behind the flanged outer end portion of the bearing sleeve, said yoke also having an internally threaded head portion, and a screw passing through said head portion of the yoke and engaging the cap or closure, said screw having a flange overhanging the head portion of the yoke and having angular external configuration to receive a wrench.

In testimony whereof, I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."